US008552574B2

(12) United States Patent
Sasaki et al.

(10) Patent No.: US 8,552,574 B2
(45) Date of Patent: Oct. 8, 2013

(54) COGENERATION APPARATUS (75) Inventors: Nobuyuki Sasaki, Wako (JP);
Katsutoshi Matsushita, Wako (JP);
Nobuyuki Yuri, Wako (JP); Koichi Oka,
Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 13/358,051

(22) Filed: Jan. 25, 2012

(65) Prior Publication Data
US 2012/0193911 A1 Aug. 2, 2012

(30) Foreign Application Priority Data
Jan. 28, 2011 (JP) ................. 2011-016799

(51) Int. Cl.
*F02B 63/04* (2006.01)

(52) U.S. Cl.
USPC ........................................ 290/1 A

(58) Field of Classification Search
USPC ...................... 290/1 A, 2, 52, 40 R
See application file for complete search history.

(56) References Cited

U.S. PATENT DOCUMENTS

| | | | |
|---|---|---|---|
| 4,715,192 A * | 12/1987 | Katz ........................... | 62/323.1 |
| 4,802,100 A * | 1/1989 | Aasen et al. .................. | 700/288 |
| 5,320,086 A | 6/1994 | Beal et al. | |
| 8,049,350 B2 * | 11/2011 | Yuri et al. .................... | 290/40 R |
| 2009/0127867 A1 * | 5/2009 | Yuri ............................ | 290/40 R |
| 2009/0127868 A1 * | 5/2009 | Yuri et al. .................... | 290/40 R |
| 2010/0156104 A1 * | 6/2010 | Bottinelli ..................... | 290/52 |
| 2010/0194111 A1 * | 8/2010 | Van Den Bossche et al. .... | 290/2 |
| 2011/0025055 A1 * | 2/2011 | Hasko et al. .................. | 290/2 |
| 2012/0211998 A1 * | 8/2012 | Beuche ........................ | 290/40 R |

FOREIGN PATENT DOCUMENTS

| | | |
|---|---|---|
| EP | 2182193 | 5/2010 |
| GB | 1380348 | 1/1975 |
| JP | 11-200951 | 7/1999 |
| JP | 2009-043526 | 2/2009 |
| JP | 2009 047053 | 3/2009 |

* cited by examiner

*Primary Examiner* — Jean F Duverne
(74) *Attorney, Agent, or Firm* — Rankin, Hill & Clark LLP (57) ABSTRACT A cogeneration apparatus for indoor installation includes: an airtight chamber provided within a housing, at least a power generator and an engine being accommodated within the airtight chamber; an intake duct connected to the airtight chamber for introducing air from outside the housing into the airtight chamber; and an exhaust duct connected to the engine for discharging exhaust gas of the engine. The air introduced through the intake duct cools the interior of the airtight chamber and is also sucked in to an air cleaner of the engine, and the exhaust gas of the engine is discharged directly to outside the airtight chamber through the exhaust duct.

4 Claims, 13 Drawing Sheets

COGENERATION APPARATUS

FIELD OF THE INVENTION

This invention relates to a cogeneration apparatus which includes an engine, power generator and exhaust heat exchanger accommodated within a housing and an external duct (chimney) interconnecting the housing and outdoors, and which is suitable for indoor installation.

BACKGROUND OF THE INVENTION

Generally, the cogeneration apparatus include: an engine as a power source; a power generator drivable by the engine to generate electric power; a heat exchanger (i.e., exhaust heat exchanger) for exchanging heat from the engine; a soundproof housing accommodating the engine, power generator and exhaust heat exchanger; an air inlet or intake port provided in one side wall of the soundproof housing for introducing air into the soundproof housing; an exhaust outlet or discharge port provided in another side wall of the soundproof housing for discharging exhaust (gas) from the engine; and a ventilation fan for sucking in air from the air intake port. A motor section for the ventilation fan is cooled directly by the air sucked in through the air intake port. One example of such cogeneration apparatus is disclosed in Japanese Patent Application Laid-Open Publication No. HEI-11-200951 (hereinafter referred to as "patent literature 1"), which can prevent overheating of the motor section provided for the ventilation fan.

Also known are cogeneration apparatus which include: a housing that is an exterior component; a partition wall partitioning or comparting the interior of the housing substantially into two compartments, i.e. a large compartment and a small compartment; a fuel battery provided in the large compartment; and an inverter provided in the small compartment. The cogeneration apparatus of this type further include: an air intake port provided in the small compartment: a communication opening provided in the partition wall for communicating between the small compartment and the large compartment; an exhaust discharge port provided in the large compartment; and a ventilation fan provided in the exhaust discharge port, and air sucked in through the air intake port is discharged through the exhaust discharge port via the communication opening. One example of such cogeneration apparatus is disclosed in Japanese Patent Application Laid-Open Publication No. 2009-43526 (hereinafter referred to as "patent literature 2"), which can efficiently cool the inverter and fuel battery.

The cogeneration apparatus disclosed in patent literature 1 can also be installed indoors if the exhaust discharge port is provided to project outdoors. Further, the cogeneration apparatus disclosed in patent literature 2 is a fuel-battery type cogeneration apparatus which includes the inverter and the fuel battery as its main components, and which can be installed indoors if arrangements are made for appropriately handling water and carbon monoxide produced from the fuel battery.

However, with the cogeneration apparatus, which includes as its main components the engine, power generator and exhaust heat exchanger and which are installed indoors, it is necessary to install the engine in an airtight chamber in order to prevent exhaust gas from flowing out from the engine to the interior of the housing, and, besides, it is difficult to positively cool the power generator.

SUMMARY OF THE INVENTION

In view of the foregoing prior art problems, it is an object of the present invention to provide an improved cogeneration apparatus which includes as its main components an engine, power generator and exhaust heat exchanger, and which can not only prevent exhaust gas from flowing out from the engine to the interior of a housing but also efficiently cool the power generator.

In order to accomplish the above-mentioned object, the present invention provides an improved cogeneration apparatus which includes: a power generator for producing electric power using an engine as a power source; an exhaust heat exchanger for effecting a heat exchange using exhaust heat of the engine; a housing accommodating therein the engine, the power generator and the exhaust heat exchanger; and an exhaust duct interconnecting the housing and outdoors, the cogeneration apparatus comprising: an airtight chamber provided within the housing, at least the power generator and the engine being accommodated within the airtight chamber; and an intake duct connected to the airtight chamber for introducing air from outside the housing into the airtight chamber. The exhaust duct is connected to the engine for discharging exhaust gas of the engine, the air introduced through the intake duct cools the interior of the airtight chamber and is also sucked in to an air cleaner of the engine, and the exhaust gas of the engine is discharged directly to outside the airtight chamber through the exhaust duct.

Because the airtight chamber is provided within the housing, at least the power generator and engine are accommodated within the airtight chamber, the intake duct for introducing air from outside the housing is connected to the airtight chamber and the exhaust duct for discharging exhaust gas of the engine is connected to the engine, the cogeneration apparatus of the invention can be installed indoors. Because the interior of the airtight chamber is cooled with the air introduced through the intake duct, the power generator can be cooled efficiently, as a result of which power generating capability of the cogeneration apparatus can be significantly enhanced.

Further, because not only the air introduced via the intake duct is sucked in to the air cleaner of the engine but also the exhaust gas is discharged directly from the exhaust duct to outside the airtight chamber (i.e., directly to outdoors), it is possible to prevent the exhaust gas from flowing out from the engine to the interior of the airtight chamber as well as to the interior of the housing, as a result of which the indoors where the cogeneration apparatus of the present invention is installed can always be maintained in a clean environment.

Preferably, in the cogeneration apparatus of the present invention, the power generator is provided underneath the intake duct, and a cover member is provided over the power generator for preventing the power generator from getting wet with water droplets entering through the intake duct. Thus, even when rain water has entered through the intake duct, for example, the present invention can prevent the power generator itself from getting wet with the rain water, as a result of which reliability of the power generator can be enhanced.

Further, preferably, in the cogeneration apparatus of the present invention, the cover member has an intake port formed in an upper portion thereof for introducing air into the power generator, and the center of the intake port is offset from the center of the intake duct. Thus, even when rain water has entered through the intake duct, for example, the present invention can prevent the power generator itself from getting wet with the rain water.

Furthermore, preferably, in the cogeneration apparatus of the present invention, the exhaust duct comprises an external duct provided outside the housing and an extension duct provided within the housing, the external duct is constructed as a dual structure comprising a first inner peripheral passage disposed centrally therein and a first outer peripheral passage disposed concentrically with and outside the first inner peripheral passage, and the extension duct is constructed as a dual structure comprising a second inner peripheral passage disposed centrally therein and a second outer peripheral passage disposed concentrically with and outside the second inner peripheral passage. The first inner peripheral passage and the second inner peripheral passage are used as an exhaust passage for discharging exhaust gas of the engine, while the first outer peripheral passage and the second outer peripheral passage are used as an intake passage for supplying air to the engine. Thus, the exhaust duct and the intake duct need not be disposed separately. In this way, the indoors can have a wider available space; namely, the indoor space can be used more efficiently than in a case where the exhaust duct and the intake duct are disposed separately. In addition, the present invention can not only reduce the installation cost and work required of the cogeneration apparatus but also simplify the necessary installation work. Besides, the present invention can achieve an enhanced space efficiency within the cogeneration apparatus.

Furthermore, preferably, the cogeneration apparatus of the present invention further comprises a connection duct provided on the housing for interconnecting the external duct and the extension duct, and the connection duct comprises an upper piece and a lower piece that are detachably connected together, the external duct being connected to the upper piece, the extension duct being connected to the lower piece. Further, the lower piece has a flange formed integrally therewith and has a lower inner connecting port and a lower outer connecting port, the second inner peripheral passage being connected to the lower inner connecting port, the second outer peripheral passage being connected to the lower outer connecting port. Furthermore, the lower inner connecting port has: a bottom portion formed in an inverted cone shape extending upward from a body portion thereof; a plurality of concentric ribs formed on the bottom portion in concentric relation to each other for preventing dripping down of condensed water produced by water vapor contained in the exhaust gas being condensed; and a plurality of slits formed in respective ones of the plurality of concentric ribs for permitting flows of the condensed water. The slits formed in adjoining ones of the concentric ribs are located at remotest, opposite positions across the lower inner connecting port. With such arrangements, the present invention can prevent the condensed water, produced by water vapor contained in the exhaust gas being condensed, from flowing out all at once.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

Figure 1:
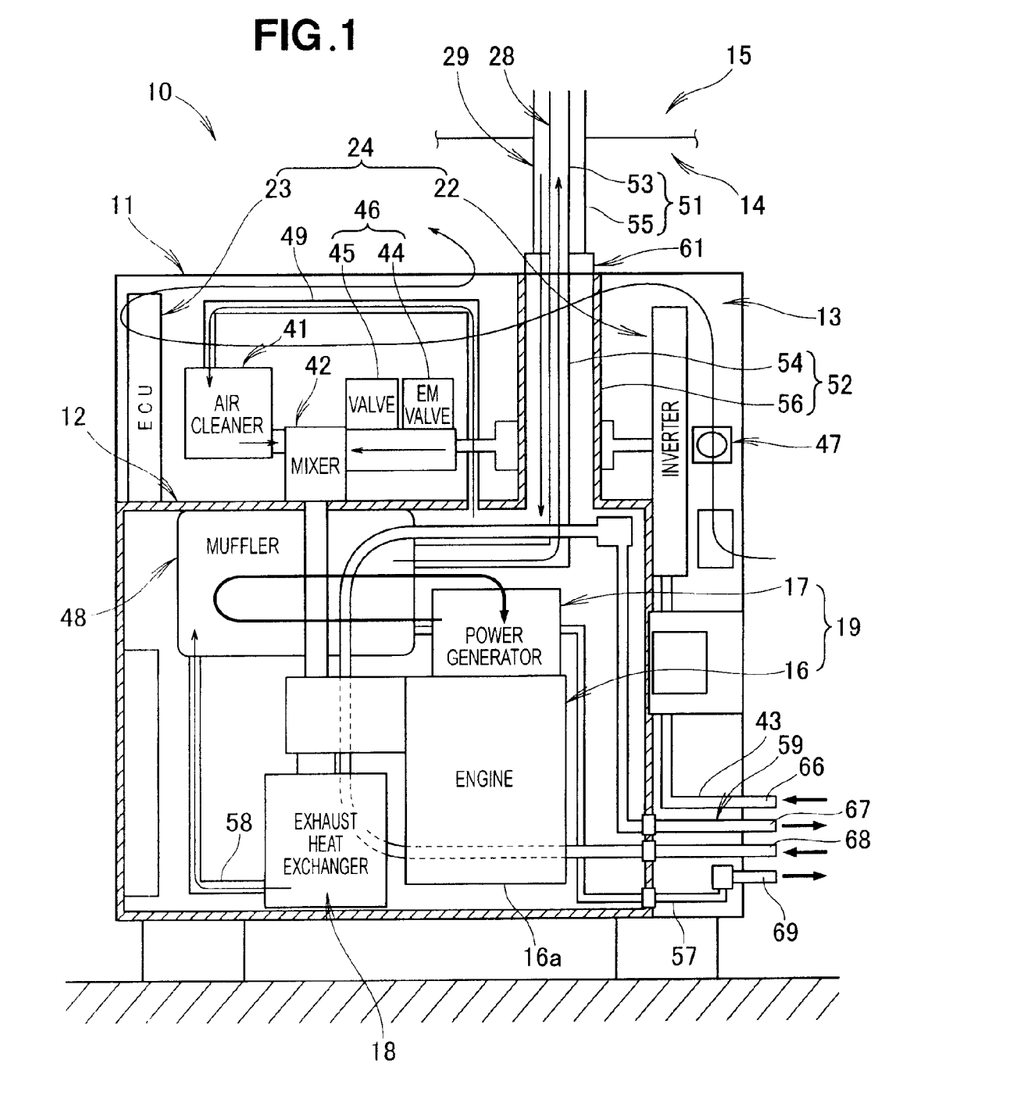
FIG. 1 is a block diagram showing an embodiment of a cogeneration apparatus of the present invention.
Figure 2:
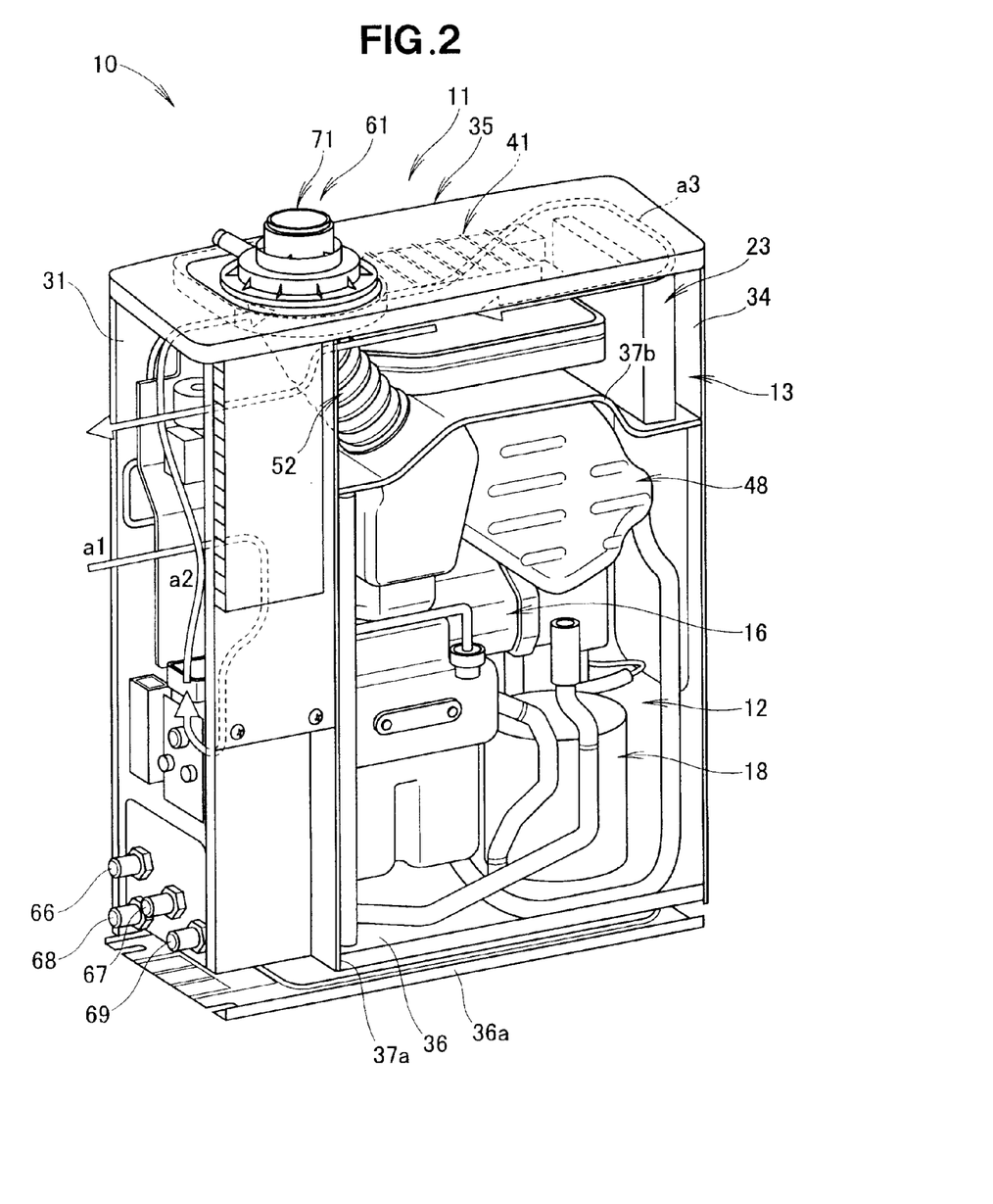
FIG. 2 is a rear perspective view of the cogeneration apparatus shown in FIG. 1.
Figure 3:
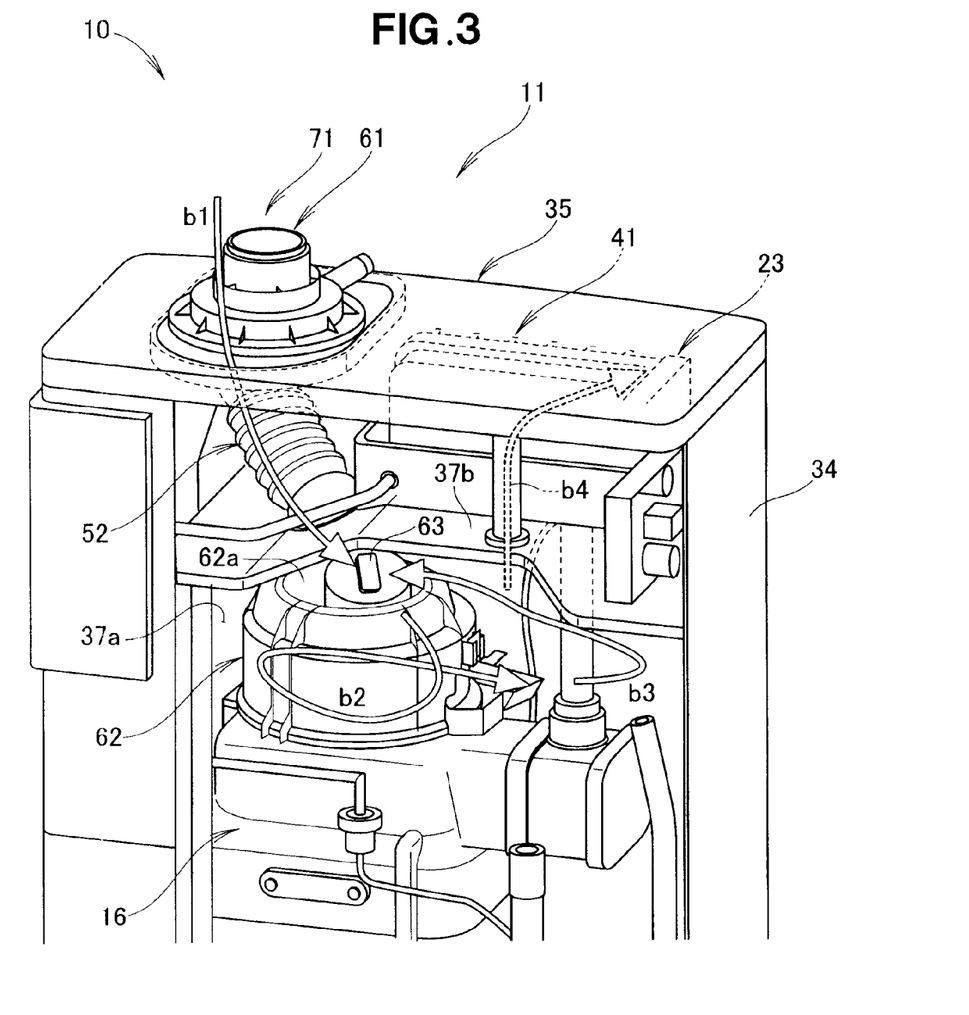
FIG. 3 is an upper rear perspective view of the cogeneration apparatus shown in FIG. 1.

Reference is now made to FIGS. 1 to 3 which illustrate in block diagram and rear perspective views, an embodiment of a cogeneration apparatus according to the present invention. The "cogeneration" is also called "combined heat and power", which is among new energy supply systems that take out power, heat and cold by use of exhaust heat of an internal combustion engine or external combustion engine and thereby achieve an enhanced total energy efficiency.

The embodiment of the cogeneration apparatus 10, which is suitably installable indoors 14, includes, as its main components: a power generator (starter-generator) 17 connectable to a commercial power source (not shown); an engine (internal combustion engine) 16 for driving the power generator 17; an exhaust heat exchanger 18 for heat-exchanging cooling water of the engine 16 with exhaust heat of the engine 16 to raise the temperature of the cooling water; an exhaust-heat-using hot-water supply/heating unit (not shown) that is supplied with the cooling water, raised in temperature by the exhaust heat exchanger 18, to produce hot water etc.; a housing 11 accommodating therein the engine 16, power generator 17 and exhaust heat exchanger 18; and an exhaust duct 28 interconnecting the housing 11 and outdoors 15. The exhaust-heat-using hot-water supply/heating unit (not shown) is a heat load in the instant embodiment. Further, the power generator 17 and the engine 16 together constitute a power generation unit 19.

The not-shown commercial power source is a power source that outputs AC power of 50 Hz (or 60 Hz) from a single-phase three-wire system with a voltage of AC 100 or 200 V. The power generator 17 and the engine 16 are integrated as the power generation unit 19 and accommodated, together with the exhaust heat exchanger 18, in an airtight chamber (power-generation-unit accommodating section) 12 provided within the housing 11.

The engine 16 is a spark-ignition engine of a water-cooling, four-cycle, single-cylinder, OHV (overhead valve) type that uses city gas or LP gas (hereinafter referred to simply as "gas") as its fuel. The engine 16 has a displacement in the range of 150-200 cc. A cylinder head (not shown) and cylinder block 16a of the engine 16 are horizontally (transversely) placed within the airtight chamber 12, and a single piston (not shown) is reciprocably mounted in the cylinder block 16a. A crankshaft (not shown) disposed vertically is connected to the piston.

The power generator 17 includes multi-pole coils and is fixed over a crankcase disposed inside a flywheel mounted on the upper end of the not-shown crankshaft. The power generator 17 generates AC power as it rotates relative to the flywheel. Also, by being energized by the commercial power source (or not-shown battery), the power generator 17 functions as a starter motor that activates (or cranks) the engine 16.

Air (intake air) is introduced from the outdoors 15 into the airtight chamber 12 via a first outer peripheral passage (intake air passage) 55, the thus-introduced air is directed from the airtight chamber 12, via an air introduction pipe 49, into an air cleaner 41 provided outside the airtight chamber 12, and then, the air cleaned by the air cleaner 41 is introduced into a mixer 42.

Gas is supplied from a fuel supply source (not shown) to the mixer 42 via a gas pipe 43 and a gas valve unit 46 comprising an electromagnetic value 44 and a link-type butterfly valve 45. Namely, the mixer 42 mixes together the air introduced from the air cleaner 41 and the supplied gas to produce an air-fuel mixture.

The air-fuel mixture produced by the mixer 42 flows to a combustion chamber (not shown) of the engine 16. An ignition plug (not shown) for igniting the air-fuel mixture is provided near the combustion chamber. More specifically, output of the not-shown battery is supplied to the ignition plug via an ignition device, comprising a power transistor, ignition coil, etc., to produce a spark discharge between electrodes facing the combustion chamber, so that the air-fuel mixture is ignited. Then, resultant exhaust gas of the engine 16 is directed from the engine 16 to a muffler (exhaust muffler) 48 where it is muffled, and then, the exhaust gas is discharged directly from the airtight chamber 12, via a second inner peripheral passage (exhaust passage) 54, connection duct 61 and first inner peripheral passage (exhaust passage) 53, to the outdoors 15.

In the engine 16, an oil tank (oil pan) is provided in a lower section (crankcase) of the cylinder block 16a. Lubricating oil for lubricating the engine 16 is retained in the oil tank. The lubricating oil is forced up by a gear pump (not shown) to lubricate sliding component parts, such as the piston, then falls down along a con rod (not shown) and cylinder wall surface and then returns to the oil tank.

Output of the power generator 17 is sent to an inverter (inverter unit) 22, which converts the output of the power generator 17 into an AC 100 or 200 V single-phase voltage by means of a DC-DC converter etc. The inverter 22 constitutes a control section 24 in conjunction with an ECU (Electronic Control Unit) in the form of a microcomputer 23, which, in response to an instruction given from the ECU 23, switches the function of the power generator 17 between a starter function for activating the engine 16 and a generator function for generating power via the engine 16.

Output of the inverter 22 is sent to an indoor distribution board (not shown), where it is adjusted to agree with electric power of the commercial power source, and then supplied to electric loads, such as lights and a washing machine. Note that generated power output (rated electric power) of the power generator 19 is in the order of 1.0 kW. Also, the cogeneration apparatus 10 includes many sensors, and output of each of the sensors is supplied to the ECU 23. The ECU 23 controls operation of the engine 16 etc. on the basis of the supplied sensor output.

A cooling water passage 59 is provided around the engine 16 for circulating cooling water (e.g., antifreeze long-life coolant). The cooling water passage 59 passes the cylinder block 16a and oil tank (not shown) of the engine 16 and exhaust heat exchanger 18 and is then connected to the external exhaust-heat-using hot-water supply/heating unit (heating unit) (not shown).

Namely, the cooling water passage 59 extends from the exhaust-heat-using hot-water supply/heating unit (not shown), through the engine 16, exhaust heat exchanger 18 and muffler 48. Namely, cold cooling water supplied from the exhaust-heat-using hot-water supply/heating unit is warmed by the engine 16, exhaust heat exchanger 18 and muffler 48 and returned to the heating unit as warm or hot water, as a result of which efficient use of heat can be achieved. Note that the exhaust heat exchanger 18 is where the cooling water is heat-exchanged with the exhaust (gas) so that it is raised in temperature.

The housing 11 is comparted into a power-generating-component accommodating section 12 where main power generating components, such as the engine 16 and power generator 17, are accommodated, and an electric-component accommodating section 13 where the control section 24, comprising the inverter 22, ECU 23, etc., is accommodated. The power-generating-component accommodating section 12 is formed as a blocked airtight chamber 12.

The engine 16, muffler 48, power generator 17, etc. are provided within the airtight chamber (power-generating-component accommodating section) 12, while the inverter 22, ECU 23, air cleaner 41, gas pipe 43, gas valve unit 46, mixer 42, fan motor 47, etc. are provided within the electric-component accommodating section 13.

More specifically, air introduced by the fan motor 47 (FIG. 1) as indicated by arrow a1 in FIG. 2 cools the inverter 22 (FIG. 1), gas valve unit 46 and mixer 42 as indicated by arrow a2, and then cools the ECU 23 as indicated by arrow a3, after which it is discharged to the indoors 14 (FIG. 1).

As shown in FIG. 1, an external duct 51 is mounted or connected to the connection duct 61 mounted to the housing 11, and air of the outdoors 15 is supplied directly from the external duct 51 to the airtight chamber 12. As will be later described, the external duct 51 comprises the first inner peripheral passage (exhaust passage) 53 and the first outer peripheral passage (intake air passage) 55 provided outside and concentrically with the first inner peripheral passage 53, and air of the outdoors 15 is supplied via the first outer peripheral passage (intake air passage) 55 into the airtight chamber 12.

The air of the outdoors 15 (FIG. 1) is supplied into the airtight chamber (power-generating-component accommodating section) 12 via the first outer peripheral passage (intake air passage) 55 (FIG. 1), as indicated by arrow b1 in FIG. 3, by negative pressures of a fan added to the power generator 17 and engine 16. The air supplied into the airtight chamber 12 is sent, by the fan of the power generator 17, from an air inlet or intake port 63 of a cover member 62 directly to the power generator 17 as indicated by arrow b2, so that the power generator 17 is cooled by the air. The air having cooled the power generator 17 is discharged into the airtight chamber 12. The air supplied into the airtight chamber 12 also cools the interior of the airtight chamber 12 as indicated by arrow b3 in FIG. 3.

Further, the air discharged from the cover member 62 into the airtight chamber 12 and the air supplied into the airtight chamber 12 is together supplied to the mixer 42 via the air introduction pipe 49 (FIG. 1) and air cleaner 41 as indicated by arrow b4 in FIG. 3.

A drain pipe 57 is connected to the muffler 48, so that condensed water, produced by water vapor contained in the exhaust gas being condensed, is discharged out of the housing 11 through the drain pipe 57.

The following describe details the component parts constituting the embodiment of the cogeneration apparatus 10. As shown in FIGS. 1 to 6, the housing 11 is formed in a substantially rectangular shape with a front panel 31, rear panel 32, left side panel 33, right side panel 34, ceiling plate (roof panel) 35 and bottom plate 36. A tray 36a is provided on the bottom plate 36, a vertical partition wall 37a is provided along the left side panel 33, and a horizontal partition wall 37b is provided along the ceiling plate 35 and between the vertical partition wall 37a and the right side panel 34.

The vertical partition wall 37a, right side panel 34, horizontal partition wall 37b, bottom plate 36 and a later-described extension duct 52 of the connection duct 61 together constitute the airtight chamber 12, and the power generator 17, engine 16, muffler 48 and exhaust heat exchanger 18 are accommodated in the airtight chamber 12 as noted above.

Figure 4:
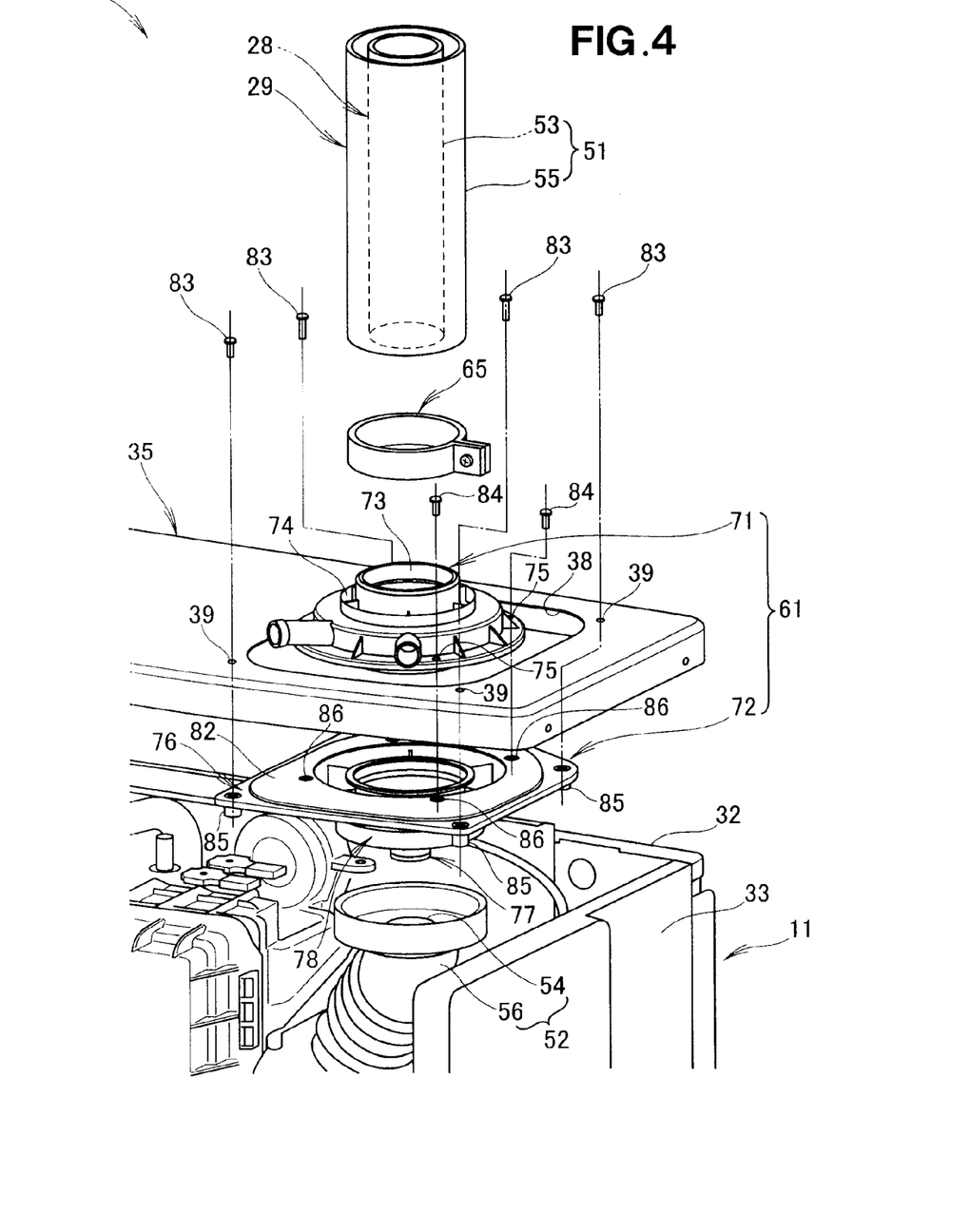
FIG. 4 is an exploded front perspective view of the cogeneration apparatus shown in FIG. 1.
Figure 5:
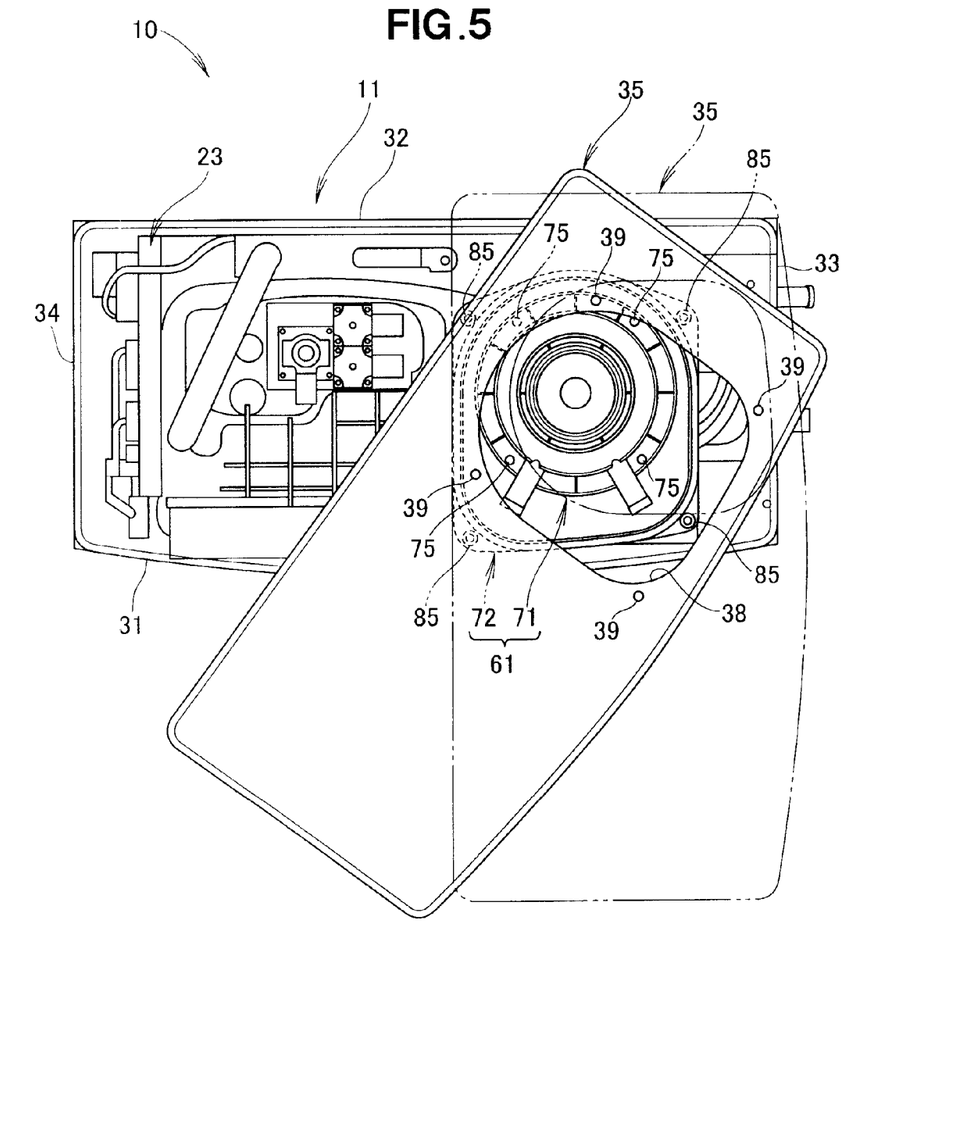
FIG. 5 is a plan view of the cogeneration apparatus shown in FIG. 1.

The ceiling plate 35 has an opening portion 38 to which a flange 76 of the connection duct 61 is mounted by means of fastening screws 83 threaded in a plurality of mounting holes 39 formed in the plate 35 around the opening portion 38, as shown in FIG. 4.

Figure 6:
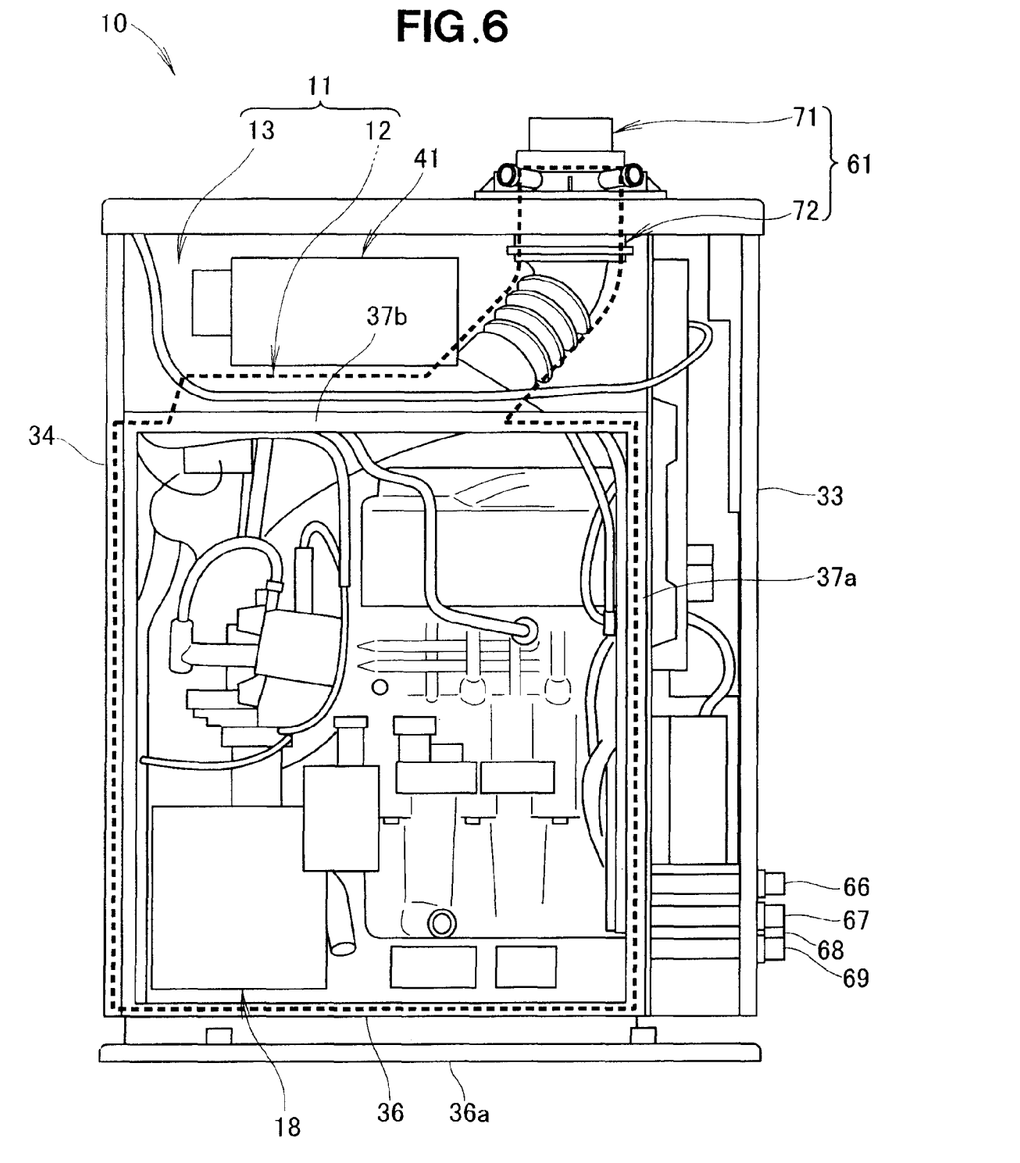
FIG. 6 is a front view of the cogeneration apparatus shown in FIG. 1.

The left side panel 33 has: a gas connecting port 66 to which is connected the gas pipe 43; high-temperature side and low-temperature side connecting ports 67 and 68 connected to the exhaust-heat-using hot-water supply/heating unit; and a drain pipe connecting port 69 to which is connected the drain pipe 57 extending from the muffler 48 (see FIG. 6).

The exhaust duct 28 comprises the external duct 51 provided outside the housing 11, and the extension duct 52 provided within the housing 11. More specifically, the exhaust duct 28 is an intake and exhaust duct having the intake duct 29 provided on its outer periphery.

The external duct 51 and the extension duct 52 are interconnected via the connection duct 61, and the external duct 51 is fixed to an upper piece 71 of the connection duct 61 by means of a metal band 65 (see FIG. 4).

Figure 7:
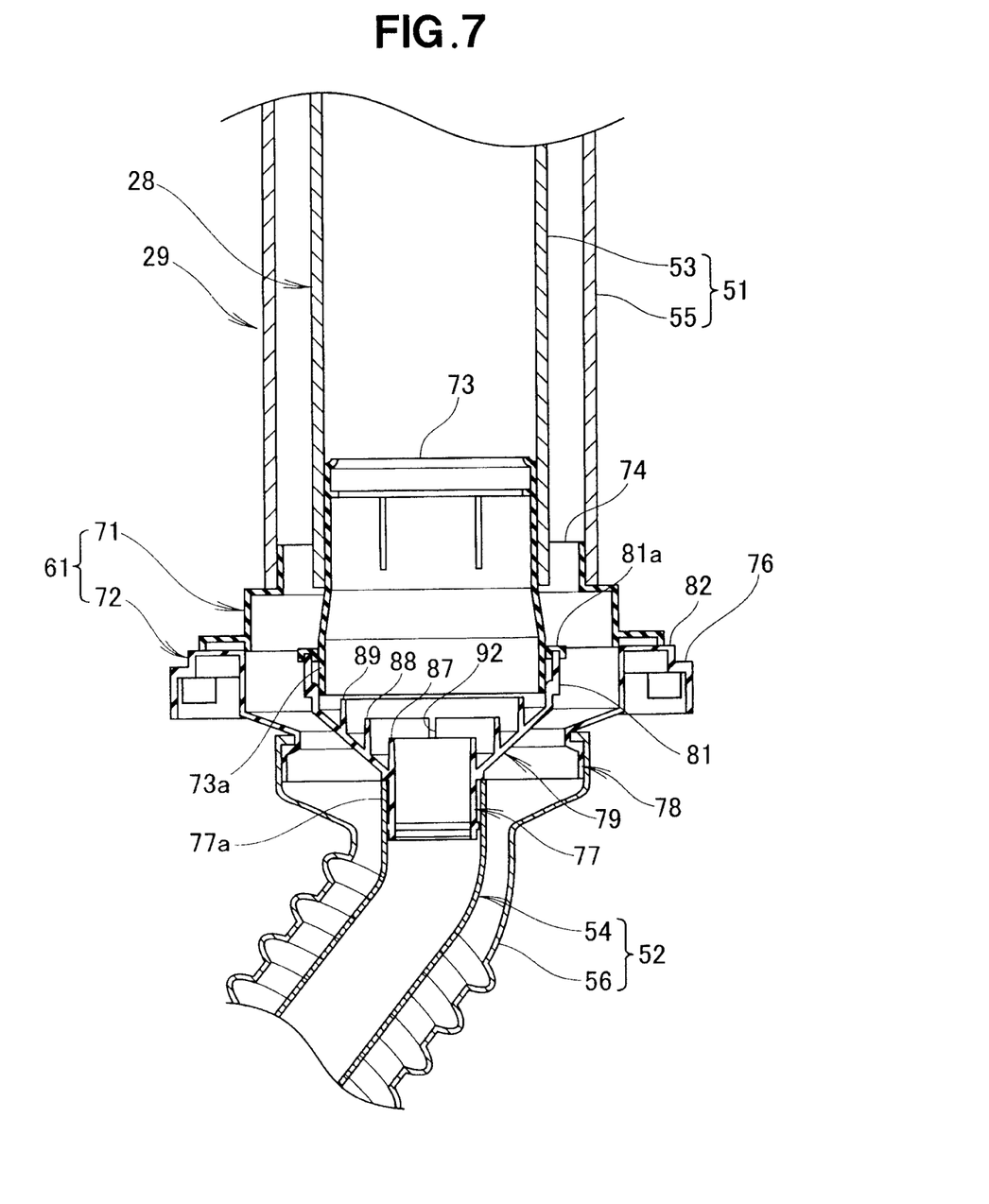
FIG. 7 is a front sectional view of the cogeneration apparatus shown in FIG. 1, which particularly shows an external duct and extension duct connected to a connection duct.
Figure 8:
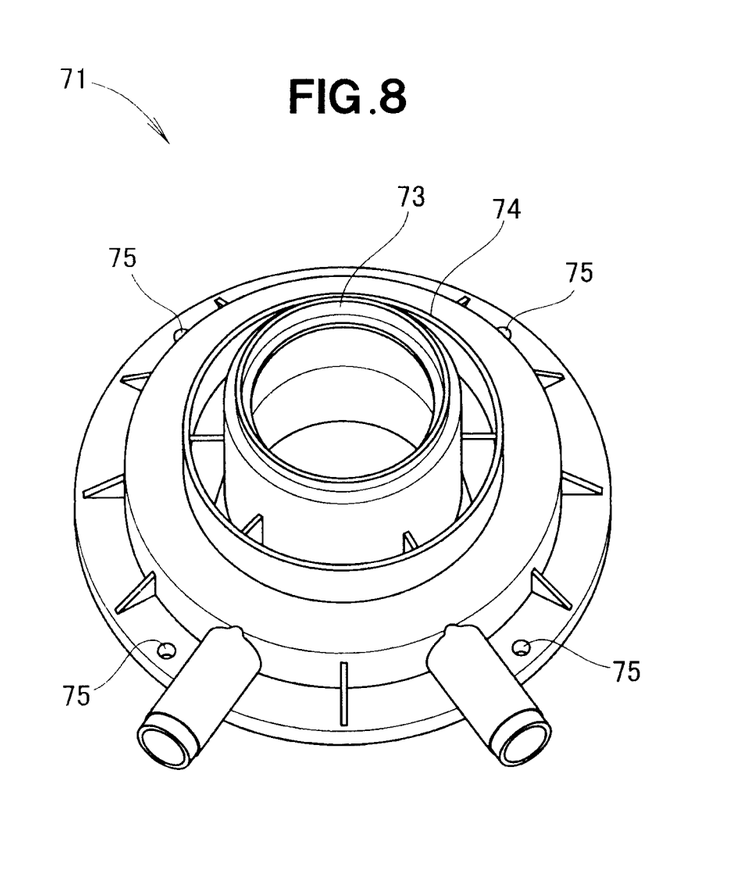
FIG. 8 is a perspective view showing an upper piece of the connection duct of the cogeneration apparatus shown in FIG. 1.

As shown in FIG. 7, the external duct (chimney) 51 is constructed as a dual structure comprising the first inner peripheral passage 53 disposed centrally therein, and the first outer peripheral passage 55 disposed concentrically with and outside the first inner peripheral passage 53.

The extension duct 52 is also constructed as a dual structure comprising the second inner peripheral passage 54 disposed centrally therein, and a second outer peripheral passage 56 disposed concentrically with and outside the second inner peripheral passage 54.

The first inner peripheral passage 53 and the second inner peripheral passage 54 are used as the exhaust passage for discharging exhaust gas of the engine 16 (FIG. 1). Further, the first outer peripheral passage 55 and the second outer peripheral passage 56 are used as an intake passage for supplying air to the engine 16. Namely, the exhaust duct 28 comprises the first inner peripheral passage 53 and second inner peripheral passage 54, while the intake duct 29 comprises the first outer peripheral passage 55 and second outer peripheral passage 56.

Namely, in the cogeneration apparatus 10, as shown in FIGS. 1 to 6, the airtight chamber 12 is provided within the housing 11, at least the power generator 17 and engine 16 are accommodated within the airtight chamber 12, the intake duct 29 (first outer peripheral passage 55 and second outer peripheral passage 56) for introducing air from outside the housing 11 is connected to the airtight chamber 12, and the exhaust duct 28 (first inner peripheral passage 53 and second inner peripheral passage 54) for discharging exhaust gas of the engine 16 is connected to the engine 16. With such arrangements, the cogeneration apparatus 10 can be installed in the indoors 14.

Further, as shown in FIGS. 4 and 7 to 11, the connection duct 61 comprises two detachably connected component parts, i.e. the upper piece 71 and a lower piece 72 that is formed integrally with the above-mentioned flange 76. The external duct 51 is connected to the upper piece 71, while the extension duct 52 is connected to the lower piece 72.

The upper piece 71 has an upper inner connecting port 73 to which the first inner peripheral passage 53 of the external duct 51 is connected, an upper outer connecting port 74 to which the first outer peripheral passage 55 is connected, and a plurality of fastening holes 75 through which fastening screws 84 are passed to be threaded into the lower piece 72.

The lower piece 72 has the flange 76 having a flat surface extending along the ceiling plate 35, a lower inner connecting port 77 to which the second inner peripheral passage 54 is connected, and a lower outer connecting port 78 to which the second outer peripheral passage 56 is connected.

The flange 76 has a raised portion 82 which is fitted in the opening portion 38, a plurality of ceiling-plate fastening bosses 85 in which the fastening screws 83 are threaded for fastening the ceiling plate 35, and a plurality of upper-piece fastening bosses 86 in which screws 84 are threaded for fastening the upper plate 71.

The lower inner connecting port 77 has: a bottom portion 79 formed in an inverted cone shape extending upward from a body portion 77a of the connecting port 77; a plurality of concentric ribs 87 to 89 formed on the bottom portion 79 in concentric relation to one another for preventing dripping down of condensed water produced by water vapor contained in the exhaust gas being condensed; a plurality of slits 91 to 93 formed in respective ones of the plurality of concentric ribs 87 to 89 for permitting flows of the condensed water; and a connecting port 81 to which a lower portion 73a of the upper inner connecting port 73 of the upper piece 71 is connected via a packing member 81a. The slits 91 to 93 formed in adjoining ones of the ribs 87 to 89 are located at remotest, opposite positions across the lower inner connecting port 77.

Because the housing 11 has: the opening portion 38 formed in the ceiling plate 35 of the housing 11; the connection duct 61 provided on the opening portion 38 for interconnecting the external duct 51 and the extension duct 52; and the flange 76 abutted against the connection duct 61 from inside (below) the opening portion 38 to close the opening portion 38, the ceiling plate 35 is movable upward and rotatable with the exhaust duct 28 connected to the flange 76.

In the cogeneration apparatus 10, as shown in FIGS. 1, 3 and 12 to 14, the power generator 17 is provided underneath the intake duct 29, and the cover member 62 is provided over the power generator 17 for preventing the power generator 17 from getting wet with water droplets entering through the intake duct 29 (first outer peripheral passage 55 and second outer peripheral passage 56).

Figure 12:
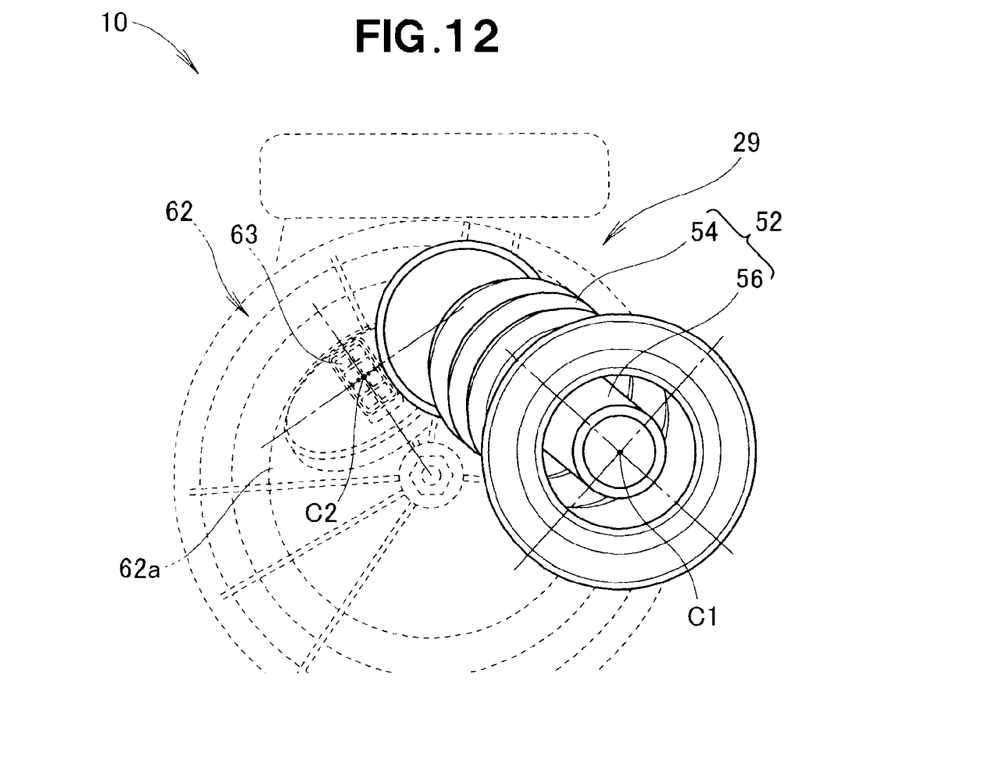
FIG. 12 is a plan view showing positional relationship between the extension duct and a cover member in the cogeneration apparatus shown in FIG. 1.

The cover member 62 has an air intake port (cover-side air intake port) 63 formed in an upper portion 62a for introducing air to the power generator 17, and the center C2 of the intake port 63 is offset from the center C1 of the intake duct 29 as seen in FIG. 12. Thus, even when water droplets entering through the intake duct 29 have fallen down onto the cover member 62 as indicated by arrow e1 in FIG. 13, the water droplets can be prevented from entering the power generator 17 through the cover-side air intake port 63.

By negative pressures of the fan (not shown) of the power generator 17 and engine 16, air of the outdoor are 15 is supplied through the first outer peripheral passage (air intake passage) 55 into the airtight chamber 12 as indicated by arrow b2 in FIG. 3. The air thus supplied into the airtight chamber 12 is directed, by the fan of the power generator 17, from the air intake port 63 of the cover member 62 directly to the power generator 17 as indicated by arrow b2, so that power generator 17 can be cooled with the air. The air having cooled the power generator 17 is discharged into the airtight chamber 12. Further, the air supplied into the airtight chamber 12 cools the interior of the airtight chamber 12 as indicated by arrow b3.

Namely, the interior of the airtight chamber 12 can be cooled with the air supplied via the intake duct 29 (first outer peripheral passage 55 and second outer peripheral passage 56). Further, the air supplied via the intake duct 29 is sucked in to the air cleaner 41 of the engine 16. Note that exhaust gas is discharged directly out of the airtight chamber 12 (i.e., discharged to the outdoors) through the exhaust duct 28 (first inner peripheral passage 53 and second inner peripheral passage 54).

The cogeneration apparatus 10, as described above particularly in relation to FIGS. 1 and 4, includes: the power generator 17 for producing electric power by being driven by the engine 16; the exhaust heat exchanger 18 effecting a heat exchange by use of exhaust heat of the engine 16; the housing 11 accommodating therein the engine 16, power generator 17 and exhaust heat exchanger 18; and the exhaust duct 28 interconnecting the housing 11 and the outdoors 15.

Further, the airtight chamber 12 is provided within the housing 11, at least power generator and engine 16 are accommodated in the airtight chamber 12, the intake duct 29 for introducing air from outside the housing 11 is connected to the housing 11, and the exhaust duct 28 for discharging exhaust gas of the engine 16 is connected to the engine 16. Thus, the cogeneration apparatus 10 can be installed in the indoors 14.

Because the interior of the airtight chamber 12 is cooled with air introduced via the intake duct 29, the power generator 17 can be cooled efficiently, as a result of which power generating capability of the cogeneration apparatus 10 can be significantly enhanced.

Further, because not only air introduced via the intake duct 29 is sucked in to the air cleaner 41 of the engine 16 but also exhaust gas is discharged directly from the exhaust duct 28 to outside the airtight chamber 12 (i.e., directly to the outdoors), it is possible to prevent the exhaust gas from flowing out from the engine 16 to the interior of the airtight chamber 12 as well as to the interior of the housing 11, as a result of which the indoors 14 where the cogeneration apparatus 10 is installed can always be maintained in a clean environment.

Figure 13:
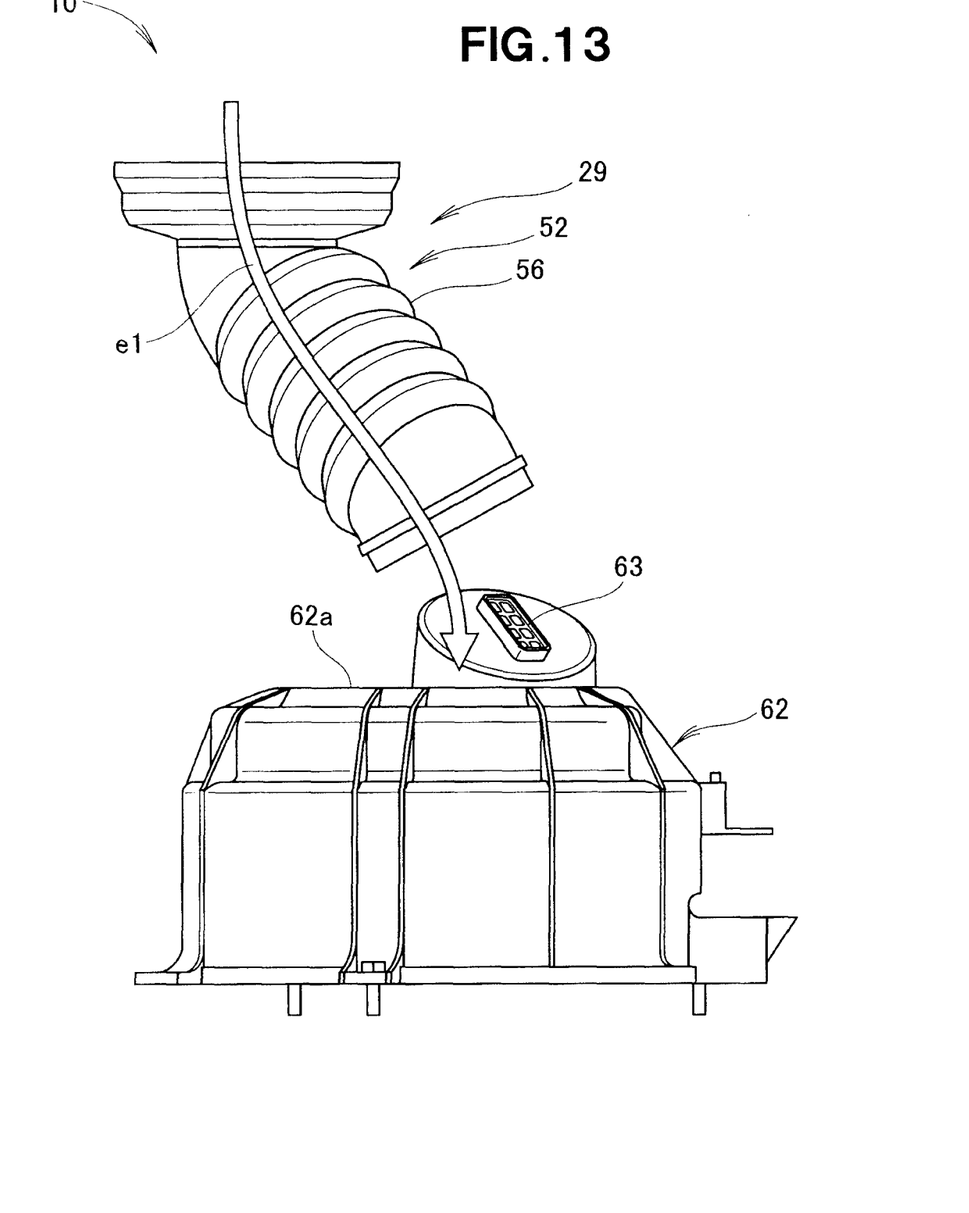
FIG. 13 is a rear view showing the extension duct and the cover member in the cogeneration apparatus shown in FIG. 1.
Figure 14:
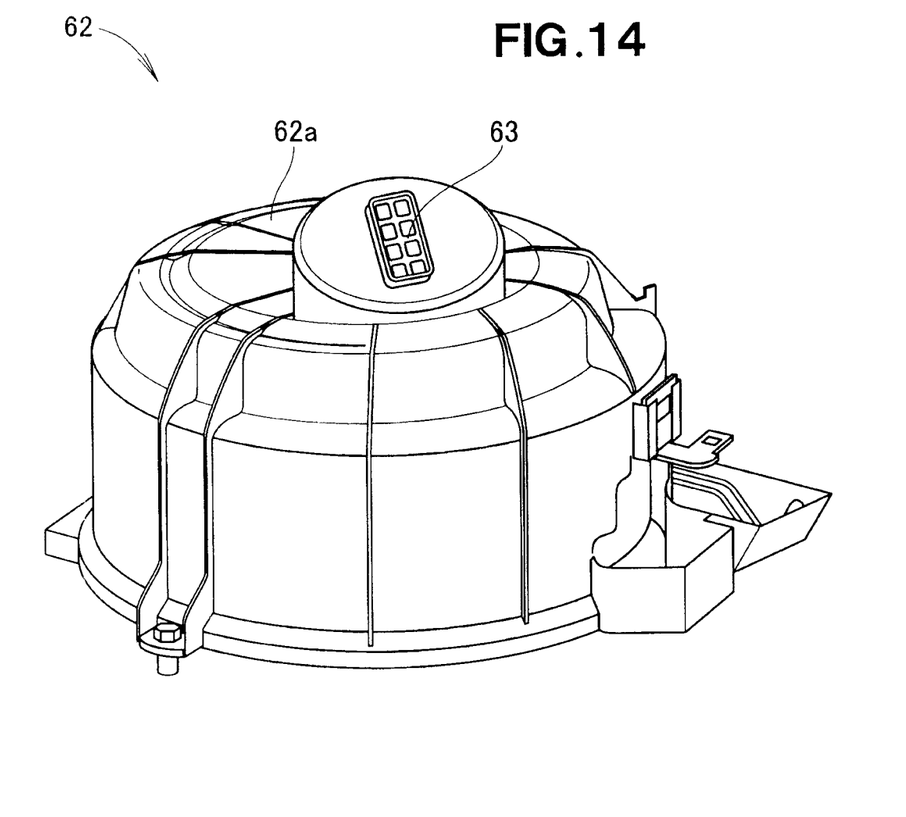
FIG. 14 is a perspective view showing the cover member in the cogeneration apparatus shown in FIG. 1.

Furthermore, as shown in FIGS. 3 and 13, the power generator 17 is provided underneath the intake duct 29 and the cover member 62 is provided over the power generator 17 for preventing the power generator 17 from getting wet with water droplets entering through the intake duct 29. Thus, even when rain water has entered through the intake duct 29, for example, it is possible to prevent the power generator 17 itself from getting wet with the rain water, as a result of which reliability of the power generator 17 can be enhanced.

Furthermore, because the cover member 62 has the air intake port 63 provided in the upper portion thereof for introducing air into the power generator 17 as shown in FIGS. 3, 12 and 13, the power generator 17 can be sufficiently cooled.

Furthermore, the center of the air intake port 63 is offset from the center of the intake duct 29. Thus, even when rain water has entered through the intake duct 29, for example, it is possible to even more reliably prevent the power generator 17 itself from getting wet with the rain water.

Furthermore, in the cogeneration apparatus 10, as described above particularly in relation to FIG. 7, the exhaust duct 28 comprises the external duct 51 provided outside the housing 11, and the extension duct 52 provided within the housing 11. The external duct 51 is constructed as a dual structure comprising the first inner peripheral passage 53 disposed centrally therein, and the first outer peripheral passage 55 disposed concentrically with and outside the first inner peripheral passage 53. The extension duct 52 is constructed as a dual structure comprising the second inner peripheral passage 54 disposed centrally therein, and a second outer peripheral passage 56 disposed concentrically with and outside the second inner peripheral passage 54.

The first inner peripheral passage 53 and the second inner peripheral passage 54 are used as the exhaust passage for discharging exhaust gas of the engine 16 while the first outer peripheral passage 55 and the second outer peripheral passage 56 are used as the intake passage for supplying air to the engine 16, and thus, the exhaust duct 28 and the intake duct 29 need not be disposed separately. In this way, the indoors 14 can have a wider available space; namely, the space can be used more efficiently than in a case where the exhaust duct 28 and the intake duct 29 are disposed separately. In addition, it is possible to not only reduce the installation cost and work required of the cogeneration apparatus 10 but also simplify the necessary installation work.

Figure 9:
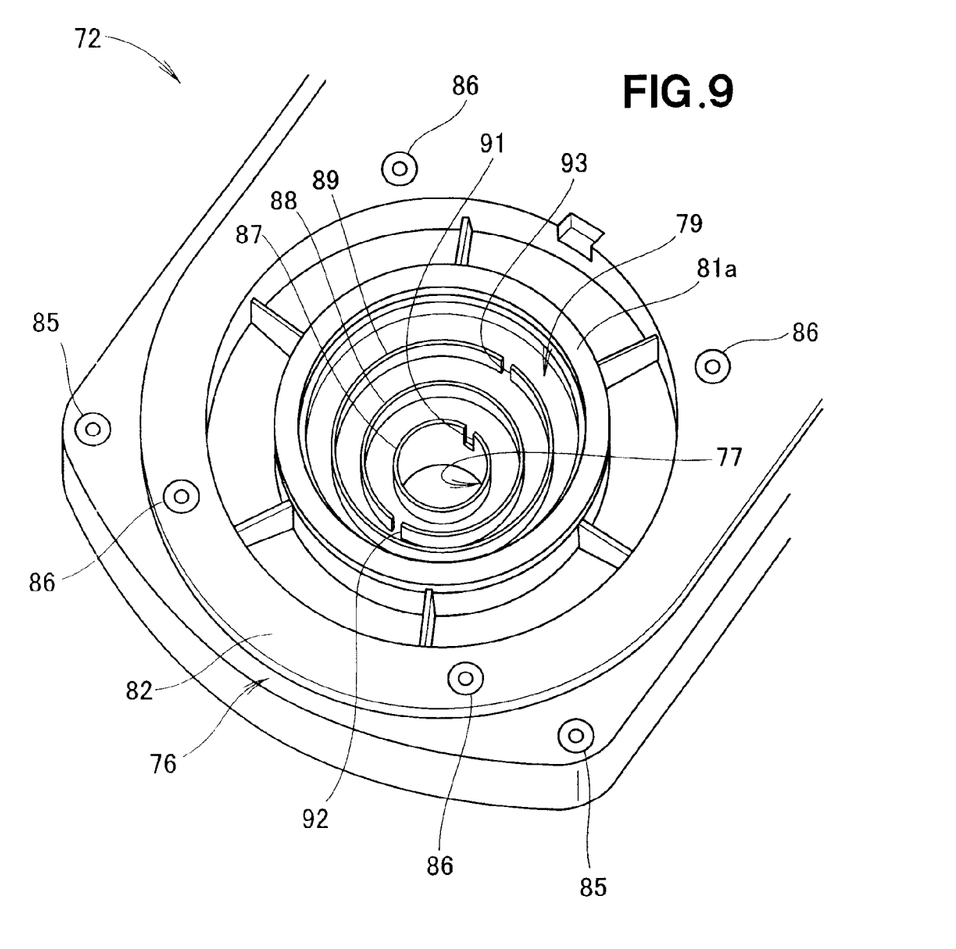
FIG. 9 is a perspective view showing a lower piece of the connection duct of the cogeneration apparatus shown in FIG. 1.
Figure 10:
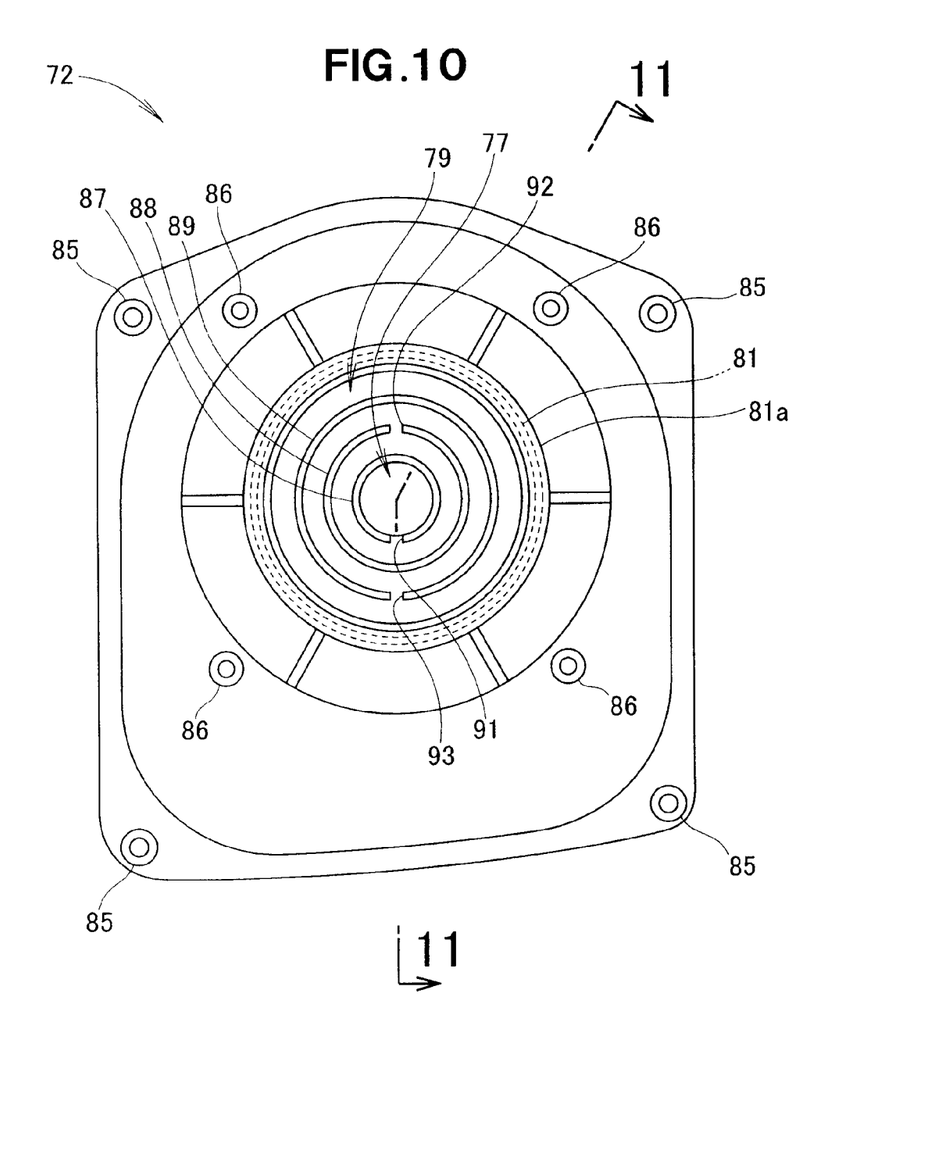
FIG. 10 is a plan view showing the lower piece of the connection duct of the cogeneration apparatus shown in FIG. 1.
Figure 11:
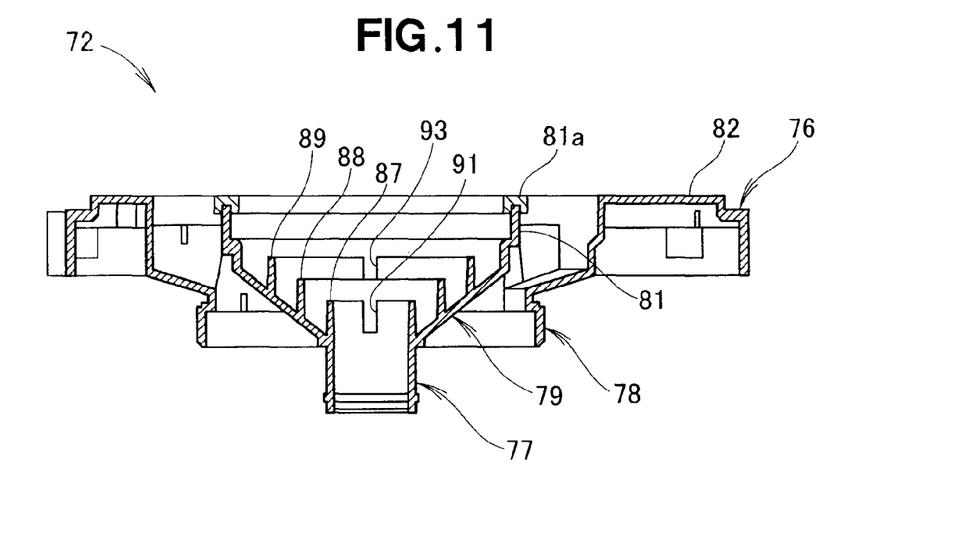
FIG. 11 is a sectional view taken along line 11-11 of FIG. 10.

Furthermore, as shown in FIGS. 4, 7 and 9, the connection duct 61, interconnecting the external duct 51 and the extension duct 52, comprises two detachably connected pieces: the upper piece 71 to which the external duct 51 is mounted; and the lower piece 72 to which the extension duct 52 is connected. The lower piece 72 integrally has the flange 76, and it also has the lower inner connecting port 77 to which the second inner peripheral passage 54 is connected, and the lower outer connecting port 78 to which the second outer peripheral passage 56 is connected.

Furthermore, the lower inner connecting port 77 has: the bottom portion 79 formed in an inverted cone shape extending upward from its body portion 77a; the concentric ribs 87 for preventing dripping down of condensed water produced by water vapor contained in the exhaust gas being condensed; and the slits 91 to 93 formed in the respective concentric ribs 87 to 89 for permitting flows of the condensed water. The slits 91 to 93 formed in adjoining ones of the slits 91 to 93 are located at remotest, opposite positions across the lower inner connecting port 77. Thus, it is possible to prevent the condensed water, produced by water vapor contained in the exhaust gas being condensed, from flowing out all at once.

Whereas the cogeneration apparatus of the present invention has been described above in relation to the case where the exhaust duct and the intake duct are provided concentrically with each other, the present invention is not so limited, and the exhaust duct and the intake duct may be provided non-concentrically with each other or separately from each other.

The basic principles of the present invention are well suited for application to cogeneration apparatus for installation indoors, such as in a basement room.

What is claimed is:

1. A cogeneration apparatus which includes: a power generator for producing electric power using an engine as a power source; an exhaust heat exchanger for effecting a heat exchange using exhaust heat of the engine; a housing accommodating therein the engine, the power generator and the exhaust heat exchanger; and an exhaust duct interconnecting the housing and outdoors, the cogeneration apparatus comprising:

an airtight chamber provided within the housing, at least the power generator and the engine being accommodated within the airtight chamber; and an intake duct connected to the airtight chamber for introducing air from outside the housing into the airtight chamber, wherein the exhaust duct is connected to the engine for discharging exhaust gas of the engine, the air introduced through the intake duct cools an interior of the airtight chamber and is also sucked in to an air cleaner of the engine, and the exhaust gas of the engine is discharged directly to outside the airtight chamber through the exhaust duct;

wherein the exhaust duct comprises an external duct provided outside the housing and an extension duct provided within the housing, wherein the external duct is constructed as a dual structure comprising a first inner peripheral passage disposed centrally therein and a first outer peripheral passage disposed concentrically with and outside the first inner peripheral passage, and the extension duct is constructed as a dual structure comprising a second inner peripheral passage disposed centrally therein and a second outer peripheral passage disposed concentrically with and outside the second inner peripheral passage, and wherein the first inner peripheral passage and the second inner peripheral passage are used as an exhaust passage for discharging exhaust gas of the engine, while the first outer peripheral passage and the second outer peripheral passage are used as an intake passage for supplying air to the engine.

2. The cogeneration apparatus according to claim 1, wherein the power generator is provided underneath the intake duct, and which further comprises a cover member provided over the power generator for preventing the power generator from getting wet with water droplets entering through the intake duct.

3. The cogeneration apparatus according to claim 2, wherein the cover member has an intake port formed in an upper portion thereof for introducing air into the power generator, and a center of the intake port is offset from a center of the intake duct.

4. The cogeneration apparatus according to claim 1, which further comprises a connection duct provided on the housing for interconnecting the external duct and the extension duct, and wherein the connection duct comprises an upper piece and a lower piece that are detachably connected together, the external duct being connected to the upper piece, the extension duct being connected to the lower piece, wherein the lower piece has a flange formed integrally therewith and has a lower inner connecting port and a lower outer connecting port, the second inner peripheral passage being connected to the lower inner connecting port, the second outer peripheral passage being connected to the lower outer connecting port, wherein the lower inner connecting port has: a bottom portion formed in an inverted cone shape extending upward from a body portion thereof; a plurality of concentric ribs formed on the bottom portion in concentric relation to each other for preventing dripping down of condensed water produced by water vapor contained in the exhaust gas being condensed; and a plurality of slits formed in respective ones of the plurality of concentric ribs for permitting flows of the condensed water, and wherein the slits formed in adjoining ones of the concentric ribs are located at remotest, opposite positions across the lower inner connecting port.

* * * * *